US006781275B2

(12) United States Patent
Reimann et al.

(10) Patent No.: US 6,781,275 B2
(45) Date of Patent: Aug. 24, 2004

(54) TANGENTIALLY SYMMETRIC DC MOTOR CARBON BRUSH SYSTEM COMPRISING A SPRING PART BEING PROVIDED WITH FIRST AND SECOND SECTIONS FIXATED TO A CARBON BRUSH PART, A SPRING PART FOR USE IN SUCH SYSTEM, AND A DC MOTOR PROVIDED WITH SUCH SYSTEM

(75) Inventors: Christian Reimann, Wehrheim (DE); Hans-Ulrich Vogler, Frankfurt/Main (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/367,359

(22) Filed: Feb. 13, 2003

(65) Prior Publication Data

US 2003/0160535 A1 Aug. 28, 2003

(30) Foreign Application Priority Data

Feb. 22, 2002 (EP) .......................................... 02003986

(51) Int. Cl.[7] ........................ H01R 39/38; H02K 5/14
(52) U.S. Cl. ...................................... 310/239; 310/247
(58) Field of Search ................................ 310/239–241, 310/245, 247

(56) References Cited

U.S. PATENT DOCUMENTS 4,785,214 A * 11/1988 Mummert .................. 310/241
4,994,701 A * 2/1991 Bulick ........................ 310/239
5,329,198 A * 7/1994 Schmidt et al. ............ 310/247

FOREIGN PATENT DOCUMENTS

DE 19750038 * 5/1999 .......... H01R/39/38

* cited by examiner

*Primary Examiner*—Burton Mullins
(74) *Attorney, Agent, or Firm*—Martin A. Farber

(57) ABSTRACT

A carbon brush spring system comprises a carbon brush arranged at a first terminal surface thereof conductively contacting a rotatable collector body (20) for electric current transfer. The system furthermore comprises a spring part arranged at a region of the carbon brush away from the first terminal surface to engage with the carbon brush for therewith establishing a current conductive interconnection to an external electric facility. The system furthermore comprises mechanical stabilizing arranged for maintaining a stable position of the carbon brush relative to the rotatable collector body in both radial and tangential directions in a housing. Particularly, the system has a substantially symmetric structure in tangential direction of rotation, through being provided with a first section (30,36) and a second section (29, 38) that collectively constitute the spring part. Furthermore, a carbon brush part (22, 24) is structurally fixed to the spring part. The first and second members together constitute a symmetric arrangement between the carbon brush part and respective attachment facilities for fixed connection to the housing, wherein the first and second sections at an intermediate range between the carbon brush and the housing are disposed away from each other at a distance that is appreciably larger than either at the carbon brush or at the housing.

24 Claims, 3 Drawing Sheets

TANGENTIALLY SYMMETRIC DC MOTOR CARBON BRUSH SYSTEM COMPRISING A SPRING PART BEING PROVIDED WITH FIRST AND SECOND SECTIONS FIXATED TO A CARBON BRUSH PART, A SPRING PART FOR USE IN SUCH SYSTEM, AND A DC MOTOR PROVIDED WITH SUCH SYSTEM

FIELD AND BACKGROUND OF THE INVENTION

The invention relates to a carbon brush spring system comprising a carbon brush that is arranged for at a first terminal surface thereof conductively contacting a rotatable collector body for electric current transfer, and furthermore comprising spring means being arranged to at a region of said carbon brush away from said first terminal surface engage with said carbon brush for therewith establishing a current conductive interconnection to an external electric facility, said system furthermore comprising mechanical stabilizing means being arranged for maintaining a stable position of said carbon brush with respect to said rotatable collector body in both radial and tangential directions in a housing. Such carbon brush systems are being used for sliding current transmitters arranged for transmitting electric current to/from commutators in direct current DC motors. A known system has been described in German Patent DE 696 04 440 T2 that has been translated from European Patent EP 741 438 B1 and corresponds to U.S. Pat. No. 5,621,262.

Such system, colloquially called in the art a “standard system” comprises many parts, such as a guiding member for the carbon brush, a carbon brush spring arrangement that is often executed in the form of a wire formed as a screw, the carbon brush proper which is in particular provided with a loose and flexible contacting conductor, and the contact rail for ultimate connection to a current supply facility. The inventors have recognized that the known arrangement contains too many parts, of which the contacting conductor (the spring) is furthermore quite difficult to maintain operational for extended periods. In fact, various and frequent defects have been reported as occurring.

Another known system is the so-called “hammer carbon brush system”, such as used in certain DC motor types of Mabuchi and/or Johnson. Here, the carbon brush and the spring have been permanently connected to each other. However, this set-up is weak in a radial direction. Reversal of the sense of rotation of the motor may cause a tangential dislocation or shift of the carbon brush. Furthermore, if an appreciable amount of wear would inevitably occur, the single-sided support can cause a further tangential shifting of the contact surface, which will have a detrimental effect on the timing characteristics of the motor. Apparently, both known solutions have a negative operational outlook, in particular when operated on a longer time scale.

Now, the present inventors have recognized the particularly advantageous properties of a structure that is substantially symmetric in the tangential direction of the rotation, and which furthermore would have only a low number of parts which parts were structurally and permanently fixated to each other.

SUMMARY OF THE INVENTION

In consequence, amongst other things, it is an object of the present invention to present a carbon brush spring system having a substantially symmetric structure in the tangential direction of the rotation that furthermore would have only a spring part and a carbon brush part that were structurally fixated to each other, as according to one of its aspects being characterized by said spring means being constituted by a single body spring part having a substantially symmetric structure in the tangential direction of rotation, being provided with a first section and a second section that collectively constitute said spring part, and a carbon brush part that is structurally fixed to the spring part, said first and second sections constituting a symmetric arrangement between said carbon brush part and respective attachment facilities for fixed connection to said housing, wherein said first and second sections at an intermediate range between said carbon brush and said housing are disposed away from each other at a distance that is appreciably larger than either at said carbon brush or at said housing.

In the above, the symmetric character would apply in particular to the part of the spring that provides the positioning of the carbon brush proper. Further extensions of the spring that would care for other aspects, such as the fixating of the spring itself to the surrounding structure or housing and the connection to the current rail could by themselves be asymmetric with regard to the overall structure of the system. According to these various aspects preferred embodiments of the invention are being characterised as follows.

A preferred embodiment of a carbon brush system according to the invention is characterized in that each said spring part section has a strip-wise cross-section.

A further preferred embodiment of such carbon brush system is characterized in that each said section has at least two bends and is, abstracted from its own strip width, fully disposed in a plane that is substantially perpendicular to the axis of said rotation.

According to another aspect of the invention said carbon brush system is characterized in that each said section forms a major bend between said carbon brush and said housing.

An alternative, preferred embodiment of a carbon brush system according to the invention is characterized in that said fixed connection is formed through bending each said first and second section at least partially around two poles according to at least two minor bends per said first or second section, wherein said poles are fixed to said housing.

Another preferred embodiment of a carbon brush system according to the invention is characterized in that a single section of said first and second sections has an extending part for connecting to a current connector disposed at said housing.

A preferred embodiment of a carbon brush system according to the invention is characterized in that said first and second sections together have the approximate shape of a diamond figure with rounded ends of the tangential axis, being furthermore interconnected at one end of its radial axis end and separated at the other end of its radial axis.

Said tangential axis may be chosen longer than said radial axis.

A preferred embodiment of a carbon brush system according to the invention is characterized in that carbon brush system is provided by one or more axially oriented poles as immediate stoppers against a tangential displacement of said carbon brush.

Said axially oriented poles may be are located substantially adjacent said rotatable collector body.

The invention also relates to a spring part for use in a carbon brush spring system according to the invention, and to a DC motor provided with a system according to the invention. Further advantageous aspects of the invention are recited herein.

BRIEF DESCRIPTION OF THE DRAWINGS

These and further aspects and advantages of the invention will be discussed more in detail hereinafter with reference to the disclosure of preferred embodiments, and in particular with reference to the appended Figures that show.

DETAILED DESCRIPTION OF THE PREFERRED EMBODIMENT

Figure 1:
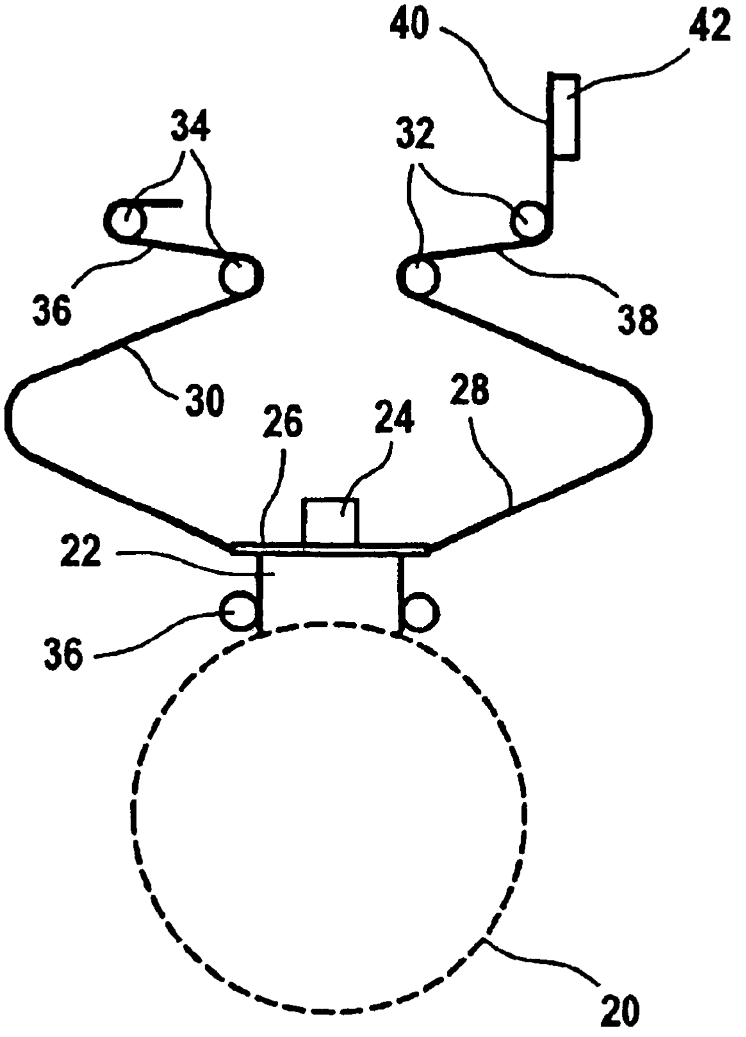
FIG. 1, a side view of a carbon brush arrangement according to the invention.

FIG. 1 illustrates a side view of a carbon brush arrangement according to the invention. As clearly shown, the overall system comprises a single body spring part having a left hand spring section 30 and a right hand spring section 28 that together in the embodiment have the overall shape of a diamond, lozenge or ellipse with a tangential axis and a radial axis with respect to the rotatable collector body 20 of the DC motor not further shown for brevity. In the embodiment, the tangential axis is the longer one, and the diamond shape has major bends at the ends of this tangential axis. This major bend would in this embodiment produce the major part of the possibility for radial movement of the carbon brush proper that has two sections 22 and 24. In the embodiment, the brush section 22 that is closer to the rotatable body 20 is larger (i.e. has a larger dimension) than the section 24 that is further away from the rotatable body 20, both having a generally rectangular cross section. Lower section 22 has been shaped so as to closely conform to the shape of rotatable body 20. Instead of a rectangular shape or form for section 24 a cylindrical form may be used. The transition area between the two spring sections 28 and 30 of the spring part intersect with the transition position from brush section 22 to brush section 24, and brush section 24 has been fixated to the spring part by pressing the same into a tightly fitting hole in the above transition area between the two spring sections 28 and 30 of the spring part, or fixed together during manufacturing. Locally, the transition area of the spring sections may have a different width from the remainder of the spring part, and may be in the form of a widening of the spring material itself.

Alternatively, the spring could be constituted by two members shaped as the above sections and fixed together by means of a specific connection through an appropriate joining process.

As would be apparent to persons skilled in the art, the mounting of the double spring system on the carbon brush proper would represent straightforward technology. Likewise, the radial interconnection with a carrier structure would be straightforward as well. The electric contact with the interconnections of the motor is effected immediately along the metal of the springs. This is quite easy to maintain, inasmuch as the spring has quite a bit higher stiffness than standard conductors constructed with stranded wires. Due to the symmetric arrangement of the two spring sections, the tangential stiffness is also sufficient, and could to a large degree be dimensioned independently of the radial stiffness.

For example the fixating of the two spring sections to the housing proper of the motor, two pairs of minor bends are positioned partially around pole pairs 32 and 34, the intermediate parts 36, 38 of the two spring sections running substantially straight between the respective poles of each pair. For brevity, the housing proper has not been shown further. Finally, an extension 40 of one of the two spring sections is fixed to part 42 that functions as an electrical connection plug, which may have an appropriate shape not pertinent to the invention.

In a situation where higher requirements to the exact structural position of spring sections 28 and 30 are posed, further poles 36 could be provided against tangential movement. In the embodiment they would provide better support and immediate fixation of the carbon brush part 22 proper, but other structures would be feasible. The radial stiffness of the overall arrangement is sufficient, and no further fixating would be required. The additional poles could be furthermore operative as a countermeasure against the getting stuck of the brush proper in case the latter would reach its operational end through long-time abrasion. This would prevent a situation where and edge or other part of the brush would get "hooked" by the collector body.

Figure 2:
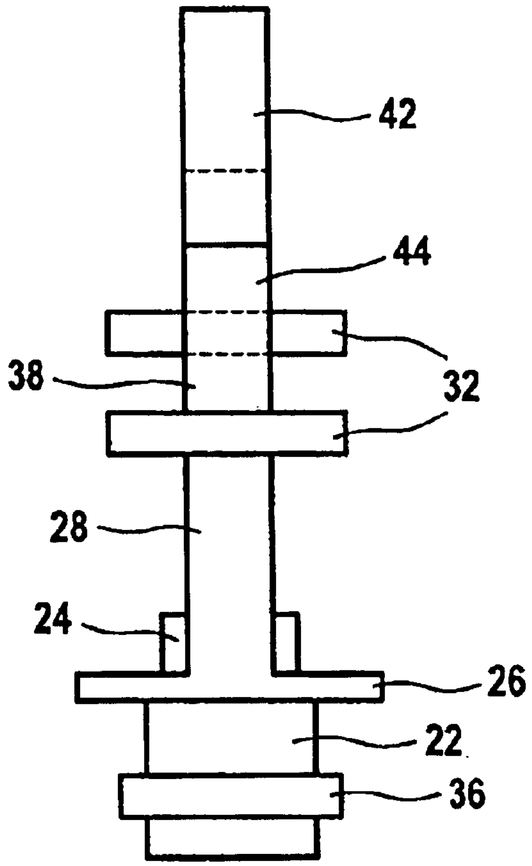
FIG. 2, a view at 90° with respect to FIG. 1.

FIG. 2 illustrates a view at 90° with respect to FIG. 1, in particular, from the right. Spring section 28 has a certain width to realize the required stiffness, in combination with the effectively chosen thickness and the material properties or alloy chosen. Persons skilled in the art would be immediately able to select the substance, and also to select suitable dimensions for the system. In certain situations, the spring part could be formed from wire of a suitable thickness. Furthermore are visible the plug or connector part 42, the various parts of the spring section 44, 38, 28, the connecting pole pair to the housing 32, the carbon brush proper with upper (24) and lower (22) parts, the pole 36 for tangential fixating of the carbon brush, and the transition area 26 between the two spring members of the spring part.

Figure 3:
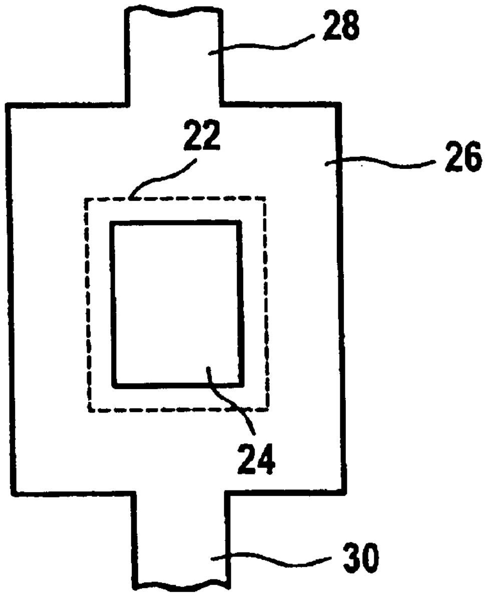
FIG. 3, a top view of the interconnection between the spring and the carbon brush according to the preferred embodiment.

FIG. 3 illustrates a top view of the interconnection at the transition area 26 between the two sections 28 and 30 of the spring part and the carbon brush proper according to the preferred embodiment. Notably, here the width of the transition area 26 has been chosen relatively broad.

Figure 4A:
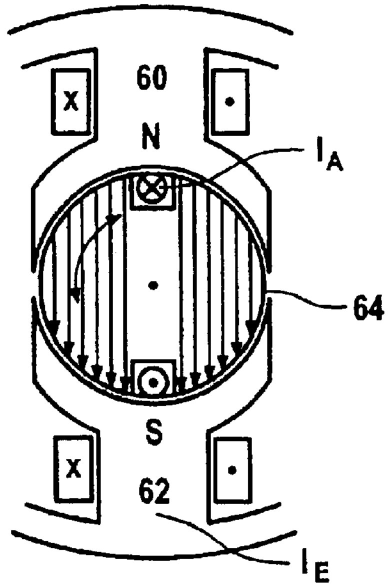
FIGS. 4*a*–4*c*, a DC motor suitable for practicing the invention.
Figure 4B:
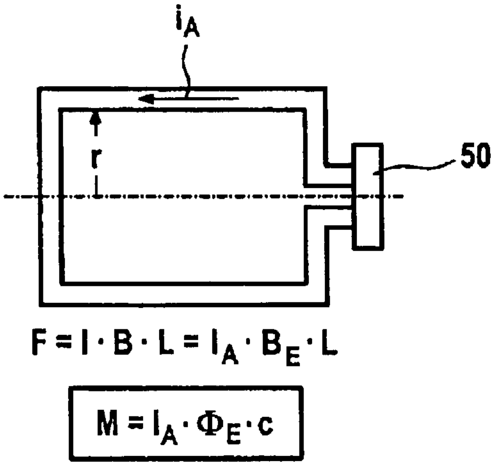
Figure 4C:
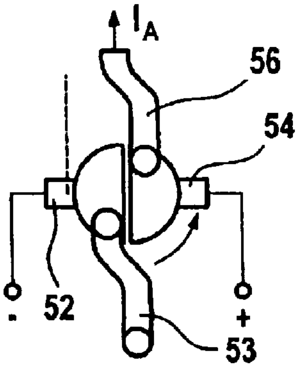

FIGS. 4*a*–4*c* illustrate a DC motor suitable for practicing the invention, but which furthermore would generally constitute the state of the art. In FIG. 4*a,* the stator structure has North pole N 60 and South pole S 62 provided with appropriate current carrying coils. Also the rotor 64 as indicated has a coil, of which only a single winding has been effectively shown. Stator current $I_E$ and rotor current $I_A$ have also been indicated. FIG. 4*b* shows a single conducting loop of the rotor 64 of FIG. 4*a,* and associated commutator ring 50 that consists of two insulated parts that each constitute one half of the ring. FIG. 4*c* illustrates an axial view of the commutator, showing the two halves thereof, two carbon brushes 52, 54, and the connections 56, 58 to the rotor conductor coil. For brevity, the construction of the carbon brush systems has not been shown in this Figure, but reference is had to FIGS. 1 to 3.

The invention has been disclosed by referring to a preferred embodiment and shown in the drawing. Persons skilled in the art would recognize various changes and amendments from reading this disclosure, and in consequence, the disclosure should be considered as being exemplary rather that limitative. The scope of the Claims hereafter appended should therefore determine the rightful scope of the present invention.

What is claimed is:

1. A carbon brush spring system within a housing comprising:

a rotatable collector;

a carbon brush in electrical contact with and located at a terminal surface of said collector;

mechanical stabilizing means for maintaining a stable position of said brush with respect to said collector, said stabilizing means acting in both radial and tangential directions with respect to said collector;

a spring functionally associated with said brush and positioned away from said terminal surface, said spring comprising:

i. means for electrical contact with an external electrical element;

ii. a carbon brush part affixed to said spring part;

iii. a single body spring part having a substantially symmetrical structure tangential to rotational direction of said collector, said structure comprising a rectangular cross-section; and iv. a first and second section cooperating to form said spring, each of said first and second section comprising an intermediate portion positioned between said carbon brush and said housing and located further apart than other first and second section portions, said other first and second section portions being located at said carbon brush or said housing, and wherein each of said first and second section has at least two bends and is disposed in a plane that is substantially perpendicular to an axis of collector rotation; and attachment facilities effecting a fixed connection between said spring and said housing such that said first and second sections form a substantially symmetrical arrangement between said carbon brush part and said attachment facilities.

2. The carbon brush system according to claim 1, wherein each of said first and said second sections forms a major bend between said carbon brush and said housing.

3. The carbon brush system according to claim 1, wherein a single section of said first and second sections has an extending part for connecting to a current connector disposed at said housing.

4. The carbon according to claim 1, wherein said first and said second sections together have an approximate shape of a diamond, said shape comprising rounded ends on the tangential axis, and being furthermore interconnected at one end on its radial axis and separated at another end of its radial axis.

5. The carbon brush system according to claim 4, wherein said tangential axis of said shape is no longer than said radial axis of said shape.

6. The carbon brush system according to claim 1, further comprising one or more axially oriented poles as immediate stoppers against a tangential displacement of said carbon brush.

7. The carbon brush system according to claim 6, wherein said axially oriented poles are located substantially adjacent to said rotatable collector body.

8. A carbon brush spring system within a housing comprising:

a rotatable collector;

a carbon brush in electrical contact with and located at a terminal surface of said collector;

mechanical stabilizing means for maintaining a stable position of said brush with respect to said collector, said stabilizing means acting in both radial and tangential directions with respect to said collector;

a spring functionally associated with said brush and positioned away from said terminal surface, said spring comprising;

i. means for electrical contact with an external electrical element;

ii. a carbon brush part affixed to said spring part;

iii. a single body spring part having a substantially symmetrical structure tangential to rotational direction of said collector; and iv. a first and second section cooperating to form said spring, each of said first and second section comprising an intermediate portion positioned between said carbon brush and said housing and located further apart than other first and second section portions, said other first and second section portions being located at said carbon brush or said housing, and a single section of said first and second section has an extending part for connecting to a current connector disposed at said housing; and attachment facilities effecting a fixed connection between said spring and said housing such that said first and second sections form a substantially symmetrical arrangement between said carbon brush part and said attachment facilities.

9. The carbon brush system according to claim 8, wherein said spring part comprises a rectangular cross-section.

10. The carbon brush system according to claim 9, wherein each of said first and second section has at least two bends and is disposed in a plane that is substantially perpendicular to the axis of said rotation.

11. The carbon brush system according to claim 8, wherein each of said first and second section forms a major bend between said carbon brush and said housing.

12. The carbon brush system according to claim 8, wherein said first and second section together have an approximate shape of a diamond, said shape comprising rounded ends on the tangential axis and being furthermore interconnected at one end on its radial axis and separated at another end of its radial axis.

13. The carbon brush system according to claim 12, wherein said tangential axis of said shape is longer than said radial axis of said shape.

14. The carbon brush system according to claim 8, further comprising one or more axially oriented poles comprising immediate stoppers against a tangential displacement of said carbon brush.

15. The carbon brush system according to claim 24, wherein said axially oriented poles are located substantially adjacent to said rotatable collector body.

16. A carbon brush spring system within a housing comprising:

a rotatable collector;

a carbon brush in electrical contact with and located at a terminal surface of said collector;

mechanical stabilizing means for maintaining a stable position of said brush with respect to said collector, said stabilizing means acting in both radial and tangential directions with respect to said collector;

a spring functionally associated with said brush and positioned away from said terminal surface, said spring comprising:

i. means for electrical contact with an external electrical element;

ii. a carbon brush part affixed to said spring part;

iii. a single body spring part having a substantially symmetrical structure tangential to rotational direction of said collector; and iv. a first and second section cooperating to form said spring, each of said first and second section comprising an intermediate portion positioned between said carbon brush and said housing and located further apart than other first and second section portions, said other first and second section portions being located at said carbon brush or said housing;

attachment facilities effecting a fixed connection between said spring and said housing such that said first and second sections form a substantially symmetrical arrangement between said carbon brush part and said attachment facilities; and one or more axially oriented poles comprising immediate stoppers against a tangential displacement of said carbon brush.

17. The carbon brush system according to claim 16, wherein said spring part comprises a rectangular cross-section.

18. The carbon brush system according to claim 17, wherein each of said first and second section has at least two bends and is disposed in a plane that is substantially perpendicular to the axis of said rotation.

19. The carbon brush system according to claim 16, wherein each of said first and second section forms a major bend between said carbon brush and said housing.

20. The carbon brush system according to claim 16, wherein a single section of said first and second section has an extending part for connecting to a current connector disposed at said housing.

21. The carbon brush system according to claim 16, wherein said first and second section together have an approximate shape of a diamond, said shape comprising rounded ends on the tangential axis and being furthermore interconnected at one end on its radial axis and separated at another end of its radial axis.

22. The carbon brush system according to claim 21, wherein said tangential axis of said shape is longer than said radial axis of said shape.

23. The carbon brush system according to claim 16, wherein said axially oriented poles are located substantially adjacent to said rotatable collector body.

24. The carbon brush system according to claim 16, wherein said axially oriented poles are located substantially adjacent to said rotatable collector body.

* * * * *